United States Patent
Miller et al.

(10) Patent No.: US 12,492,649 B2
(45) Date of Patent: Dec. 9, 2025

(54) LUBRICATION SYSTEM AND METHODS OF LUBRICATING A GEARBOX ASSEMBLY

(71) Applicant: General Electric Company, Schenectady, NY (US)

(72) Inventors: Brandon W. Miller, West Chester, OH (US); Ryan T. Roehm, West Chester, OH (US); Andrew Hudecki, Milford, OH (US); Arthur W. Sibbach, Boxford, MA (US)

(73) Assignee: GENERAL ELECTRIC COMPANY, Evendale, OH (US)

( * ) Notice: Subject to any disclaimer, the term of this patent is extended or adjusted under 35 U.S.C. 154(b) by 0 days.

(21) Appl. No.: 18/655,544

(22) Filed: May 6, 2024

(65) Prior Publication Data

US 2025/0341176 A1    Nov. 6, 2025

(51) Int. Cl.
*F01D 25/18* (2006.01)
*F16H 57/04* (2010.01)

(52) U.S. Cl.
CPC ......... *F01D 25/18* (2013.01); *F16H 57/0415* (2013.01); *F16H 57/0439* (2013.01); *F16H 57/0442* (2013.01); *F16H 57/0475* (2013.01); *F05D 2260/98* (2013.01)

(58) Field of Classification Search
CPC ... F01D 25/18; F05D 2260/98; F05D 2250/50
See application file for complete search history.

(56) References Cited

U.S. PATENT DOCUMENTS

| | | | | |
|---|---|---|---|---|
| 4,431,372 | A | * | 2/1984 | Dadhich ................. F01D 25/20 184/6.28 |
| 5,667,051 | A | * | 9/1997 | Goldberg ................. F02C 7/32 60/329 |
| 5,845,483 | A | | 12/1998 | Petrowicz |
| 7,662,059 | B2 | | 2/2010 | McCune |
| 7,815,536 | B2 | | 10/2010 | Jansen et al. |
| 7,849,668 | B2 | | 12/2010 | Sheridan |
| 7,883,438 | B2 | | 2/2011 | McCune |
| 8,007,253 | B2 | | 8/2011 | Dooley |
| 8,307,626 | B2 | * | 11/2012 | Sheridan ................. F01D 25/20 184/29 |
| 8,702,373 | B1 | | 4/2014 | Valva et al. |
| 9,086,055 | B2 | | 7/2015 | Subramaniam et al. |
| 9,903,227 | B2 | | 2/2018 | Cigal |

(Continued)

*Primary Examiner* — Eldon T Brockman
(74) *Attorney, Agent, or Firm* — Venable LLP; Peter T. Hrubiec; Michele V. Frank (57) ABSTRACT

A lubrication system for a turbine engine includes a reservoir that stores a lubricant, a primary lubricant supply circuit including a primary supply pump fluidly coupled to the reservoir, and an auxiliary lubricant supply circuit including an auxiliary supply pump fluidly coupled to the reservoir. A clutch is mechanically coupled to the auxiliary supply pump, and the clutch configured to engage the auxiliary supply pump and a shaft of the turbine engine when activated. The lubrication system further includes a pressure sensor that monitors a lubricant pressure within the primary lubricant supply circuit. When the lubricant pressure within the primary lubricant supply circuit falls below a predetermined lubricant threshold, the clutch is activated to engage the auxiliary supply pump and the shaft of the turbine engine.

20 Claims, 5 Drawing Sheets

(56) References Cited

U.S. PATENT DOCUMENTS

| | | | |
|---|---|---|---|
| 10,167,873 B2 | 1/2019 | Sheridan et al. | |
| 10,196,926 B2 | 2/2019 | Ketchum et al. | |
| 10,208,624 B2 | 2/2019 | Duong et al. | |
| 10,267,233 B2 | 4/2019 | Mastro | |
| 10,316,855 B2 | 6/2019 | Mastro | |
| 10,371,007 B2 | 8/2019 | Cigal et al. | |
| 10,513,949 B2 | 12/2019 | Parnin et al. | |
| 10,526,913 B2 | 1/2020 | Roberge | |
| 10,570,824 B2 | 2/2020 | Schwarz et al. | |
| 10,577,974 B2 | 3/2020 | Valva et al. | |
| 10,634,053 B2 | 4/2020 | Schwarz et al. | |
| 10,801,413 B2 | 10/2020 | Roberge | |
| 10,823,005 B2 | 11/2020 | Fang et al. | |
| 10,823,006 B2 * | 11/2020 | Leque | F02K 3/06 |
| 10,975,769 B2 | 4/2021 | Segura Martinez De Ilarduya et al. | |
| 11,066,954 B2 | 7/2021 | Sheridan | |
| 11,092,037 B2 | 8/2021 | Valva et al. | |
| 11,136,908 B2 | 10/2021 | McCormick | |
| 11,441,450 B2 | 9/2022 | Mastro | |
| 11,572,805 B2 * | 2/2023 | Maguire | F02C 7/06 |
| 11,725,589 B2 | 8/2023 | Sheridan | |
| 2010/0212281 A1 * | 8/2010 | Sheridan | F01D 25/20 184/26 |
| 2011/0168494 A1 | 7/2011 | Subramaniam et al. | |
| 2019/0128141 A1 * | 5/2019 | Pech | F02C 7/277 |
| 2019/0292944 A1 * | 9/2019 | Mason | F01M 1/02 |
| 2019/0376416 A1 | 12/2019 | Mastro | |
| 2020/0291817 A1 * | 9/2020 | Leque | F01M 11/064 |
| 2021/0246811 A1 * | 8/2021 | Maguire | F02C 7/06 |
| 2025/0020070 A1 * | 1/2025 | Sibbach | F01D 25/20 |
| 2025/0043697 A1 * | 2/2025 | Miller | F01D 25/20 |

\* cited by examiner

LUBRICATION SYSTEM AND METHODS OF LUBRICATING A GEARBOX ASSEMBLY

TECHNICAL FIELD

The present specification generally relates to turbine engines and, more specifically, to lubrication systems for gearbox assemblies of a turbine engine.

BACKGROUND

Gas turbine engines, commonly used in aircraft propulsion, utilize a continuous supply of lubrication to various components to ensure proper function and longevity. Traditionally, lubrication is provided by a primary lubrication system that draws oil from a sump and circulates the oil through the engine via a pump driven by a shaft. However, during in-flight shutdown and/or windmill conditions, in which the engine fan continues to rotate due to external airflow but the engine itself is not running, the shaft, and in turn, the pump driven by the shaft, may not rotate. The stagnation of the pump may cause cessation of oil flow to a gearbox assembly, which may result in increased wear and/or component failure over time.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein are directed to turbine engines, lubrication systems and methods of supplying lubrication to a gearbox assembly of a turbine engine. The lubrication system for a turbine engine may include a reservoir that stores a lubricant, a primary lubricant supply circuit including a primary supply pump fluidly to the reservoir, and an auxiliary lubricant supply circuit including an auxiliary supply pump fluidly coupled to the reservoir. A clutch may be mechanically coupled to the auxiliary supply pump, and, when activated, the clutch may engage the auxiliary supply pump and a shaft of the turbine engine.

In these embodiments, the lubrication system may further include a sensor, such as a pressure sensor that monitors a lubricant pressure within the primary lubricant supply circuit. When the lubricant pressure within the primary lubricant supply circuit falls below a predetermined lubricant threshold, the clutch is activated to engage the auxiliary supply pump and the shaft of the turbine engine. By monitoring the lubricant pressure of the lubricant within the primary lubricant supply circuit, it may be possible to utilize the auxiliary lubricant supply circuit to maintain consistent lubrication of the turbine engine when the primary lubricant supply circuit is inactive, thereby ensuring the operational readiness and longevity of the turbine engine while mitigating the risk of wear and potential engine failure.

As described herein, conventional lubrication systems for turbine engines rely on a continuous supply of lubrication to various components to ensure proper function and longevity. In particular, the gearbox assemblies used to transmit mechanical energy generated by the engine to a fan and/or propeller include a plurality of bearings and gears that require continuous lubrication during operation in order to minimize friction and wear.

Traditionally, turbine engine lubrication systems draw oil from a sump and circulate the oil through the engine via a pump coupled to a spool shaft. Although this configuration may function effectively during normal engine conditions, oil may cease to flow through the system when the turbine engine operates in an in-flight shutdown (IFSD) condition or windmill condition, in which the engine fan continues to rotate due to external airflow while the engine itself is not running. In these embodiments, the cessation of oil flow through the lubrication system may result in increased wear on the various components of the gearbox assembly over time.

Moreover, traditional lubrication systems are ill-equipped to account for the variation in operating conditions of advanced turbine engines. For example, traditional lubrication systems may be unable to provide sufficient lubricant supply to the gearbox assembly of the turbine engine in low-flow and/or high-flow conditions, and may similarly struggle to ensure consistent lubricant flow when a rotational direction of a fan and/or propeller of the turbine engine is reversed. The disclosed lubrication system addresses these shortcomings by providing an auxiliary lubrication system that allows for consistent and/or continuous flow of lubricant to a gearbox assembly of a turbine engine during all phases of operation, thereby ensuring the operational readiness and longevity of the turbine engine while mitigating the risk of wear and potential engine failure.

Various embodiments of turbine engines, lubrication systems, and methods of lubricating a gearbox assembly of a turbine engine are described in more detail herein. Whenever possible, the same reference numerals will be used throughout the drawings to refer to the same or like parts.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As used herein, the terms "first," and "second" may be used interchangeably to distinguish one component from another and are not intended to signify location or importance of the individual components.

The terms "forward" and "aft" refer to relative positions within a gas turbine engine or vehicle, and refer to the normal operational attitude of the turbine engine or vehicle.

The terms "upstream" and "downstream" refer to the relative direction with respect to a flow in a pathway. For example, with respect to a fluid flow, "upstream" refers to the direction from which the fluid flows, and "downstream" refers to the direction to which the fluid flows. However, the terms "upstream" and "downstream" as used herein may also refer to a flow of electricity.

The terms "coupled," "fixed," "attached," "connected," and the like, refer to both direct coupling, fixing, attaching, or connecting, as well as indirect coupling, fixing, attaching, or connecting through one or more intermediate components or features, unless otherwise specified herein.

The singular forms "a," "an," and "the" include plural references unless the context clearly dictates otherwise.

As used herein, the terms "axial" and "axially" refer to directions and orientations that extend substantially parallel to a centerline of the turbine engine. Moreover, the terms "radial" and "radially" refer to directions and orientations that extend substantially perpendicular to the centerline of the turbine engine. In addition, as used herein, the terms "circumferential" and "circumferentially" refer to directions and orientations that extend arcuately about the centerline of the turbine engine.

Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value, or the precision of the methods or machines for constructing or manufacturing the components and/or systems. In at least some instances, the approximating language may correspond to the precision of an instrument for measuring the value, or the precision of the methods or machines for constructing or manufacturing the components and/or systems. For example, the approximating language may refer to being within a 1, 2, 4, 5, 10, 15, or 20 percent margin in either individual values, range(s) of values and/or endpoints defining range(s) of values.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Figure 1:
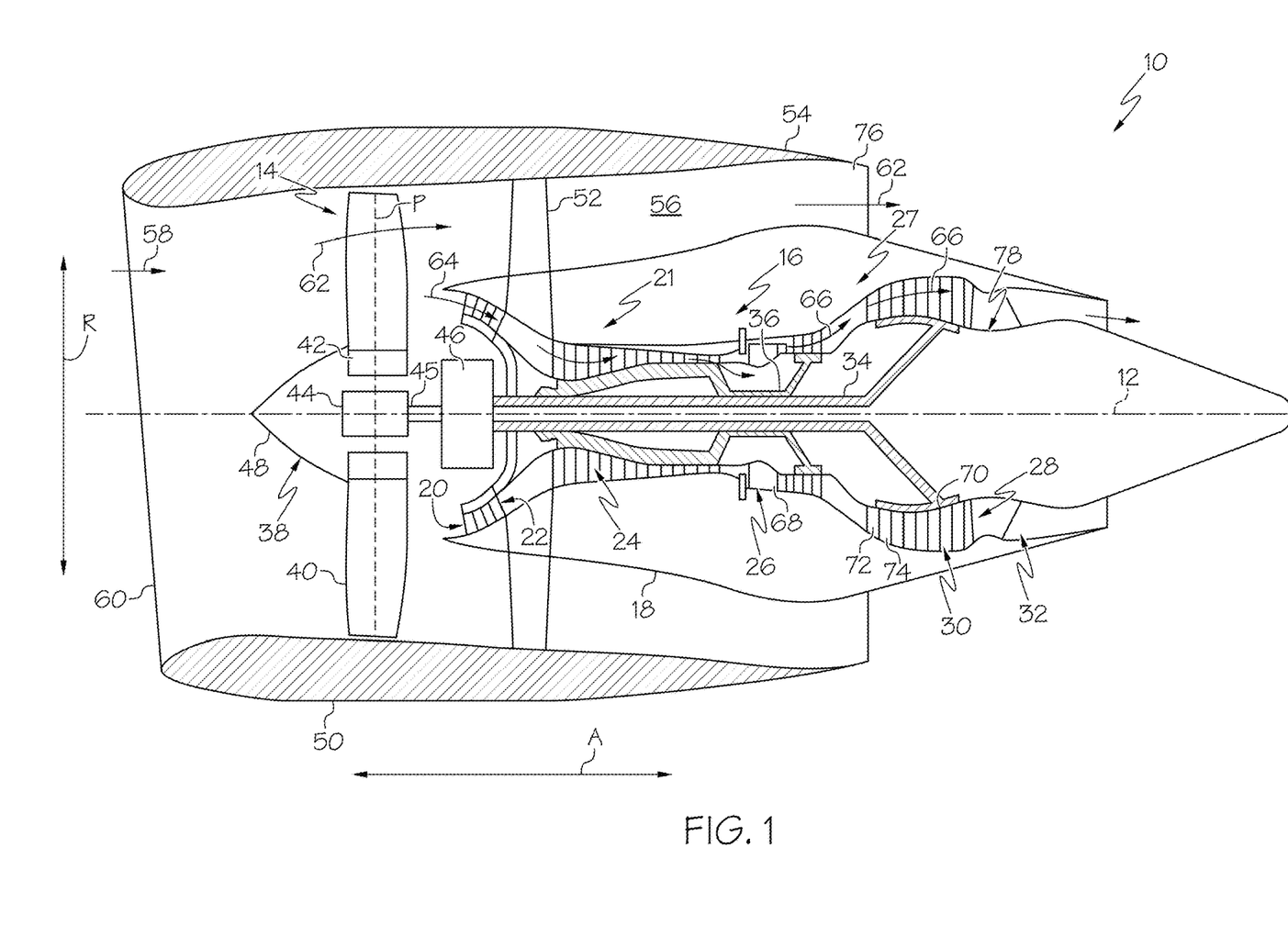
FIG. 1 schematically depicts a cross-sectional diagram of a turbine engine, taken along a centerline axis of the turbine engine, according to one or more embodiments shown and described herein.

Referring now to the drawings, FIG. 1 is a schematic cross-sectional diagram of a turbine engine 10, taken along a centerline axis of the turbine engine 10, according to an embodiment of the present disclosure. As shown in FIG. 1, the turbine engine 10 defines an axial direction A (extending parallel to a longitudinal, centerline axis 12 provided for reference) and a radial direction R that is normal to the axial direction A. In general, the turbine engine 10 includes a fan section 14 and a core turbine engine 16 disposed downstream from the fan section 14.

The core turbine engine 16 depicted generally includes an outer casing 18 that is substantially tubular and defines an annular inlet 20. As schematically shown in FIG. 1, the outer casing 18 encases, in serial flow relationship, a compressor section 21 including a booster or a low pressure (LP) compressor 22 followed downstream by a high pressure (HP) compressor 24, a combustion section 26, a turbine section 27 including a high pressure (HP) turbine 28 followed downstream by a low pressure (LP) turbine 30, and a jet exhaust nozzle section 32. A high pressure (HP) shaft 34 or spool drivingly connects the HP turbine 28 to the HP compressor 24 to rotate the HP turbine 28 and the HP compressor 24 in unison. A low pressure (LP) shaft 36 drivingly connects the LP turbine 30 to the LP compressor 22 to rotate the LP turbine 30 and the LP compressor 22 in unison. The compressor section 21, the combustion section 26, the turbine section 27, and the jet exhaust nozzle section 32 together define a core air flow path.

For the embodiment depicted in FIG. 1, the fan section 14 includes a fan 38 (e.g., a variable pitch fan) having a plurality of fan blades 40 coupled to a disk 42 in a spaced apart manner. As depicted in FIG. 1, the fan blades 40 extend outwardly from the disk 42 generally along the radial direction R. Each fan blade 40 is rotatable relative to the disk 42 about a pitch axis P by virtue of the fan blades 40 being operatively coupled to an actuation member 44 configured to collectively vary the pitch of the fan blades 40 in unison. The fan blades 40, the disk 42, and the actuation member 44 are together rotatable about the centerline axis 12 via a fan shaft 45 that is powered by the LP shaft 36 across a power gearbox, also referred to as a gearbox assembly 46. The gearbox assembly 46 is shown schematically in FIG. 1. The gearbox assembly 46 includes a plurality of gears for adjusting the rotational speed of the fan shaft 45 and, thus, the fan 38 relative to the LP shaft 36 to a more efficient rotational fan speed.

Referring still to the exemplary embodiment of FIG. 1, the disk 42 is covered by a rotatable fan hub 48 aerodynamically contoured to promote an airflow through the plurality of fan blades 40. In addition, the fan section 14 includes an annular fan casing or a nacelle 50 that circumferentially surrounds the fan 38 and/or at least a portion of the core turbine engine 16. The nacelle 50 is supported relative to the core turbine engine 16 by a plurality of circumferentially spaced outlet guide vanes 52. Moreover, a downstream section 54 of the nacelle 50 extends over an outer portion of the core turbine engine 16 to define a bypass airflow passage 56 therebetween.

During operation of the turbine engine 10, a volume of air 58 enters the turbine engine 10 through an inlet 60 of the nacelle 50 and/or the fan section 14. As the volume of air 58 passes across the fan blades 40, a first portion of air 62 is directed or routed into the bypass airflow passage 56, and a second portion of air 64 is directed or is routed into the upstream section of the core air flow path, or, more specifically, into the annular inlet 20 of the LP compressor 22. The ratio between the first portion of air 62 and the second portion of air 64 is commonly known as a bypass ratio. The pressure of the second portion of air 64 is then increased as the second portion of air 64 routed through the HP compressor 24 and into the combustion section 26, where the highly pressurized air is mixed with fuel and burned to provide combustion gases 66.

The combustion gases 66 are routed into the HP turbine 28 and expanded through the HP turbine 28 where a portion of thermal and/or of kinetic energy from the combustion gases 66 is extracted via sequential stages of HP turbine stator vanes 68 that are coupled to the outer casing 18 and HP turbine rotor blades 70 that are coupled to the HP shaft 34, thus, causing the HP shaft 34 to rotate, thereby supporting operation of the HP compressor 24. The combustion gases 66 are then routed into the LP turbine 30 and expanded through the LP turbine 30. Here, a second portion of thermal and kinetic energy is extracted from the combustion gases 66 via sequential stages of LP turbine stator vanes 72 that are coupled to the outer casing 18 and LP turbine rotor blades 74 that are coupled to the LP shaft 36, thus, causing the LP shaft 36 to rotate, thereby supporting operation of the LP compressor 22 and rotation of the fan 38 via the gearbox assembly 46.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before being exhausted from a fan nozzle exhaust section 76 of the turbine engine 10, also providing propulsive thrust. The HP turbine 28, the LP turbine 30, and the jet exhaust nozzle section 32 at least partially define a hot gas path 78 for routing the combustion gases 66 through the core turbine engine 16.

The turbine engine 10 depicted in FIG. 1 is by way of example only. In other exemplary embodiments, the turbine engine 10 may have any other suitable configuration. For example, in other exemplary embodiments, the fan 38 may be configured in any other suitable manner (e.g., as a fixed pitch fan) and further may be supported using any other suitable fan frame configuration. Moreover, in other exemplary embodiments, any other suitable number or configuration of compressors, turbines, shafts, or a combination thereof may be provided. In still other exemplary embodiments, aspects of the present disclosure may be incorporated into any other suitable gas turbine engine, such as, for example, turbofan engines, propfan engines, turbojet engines, and/or turboshaft engines.

Figure 2:
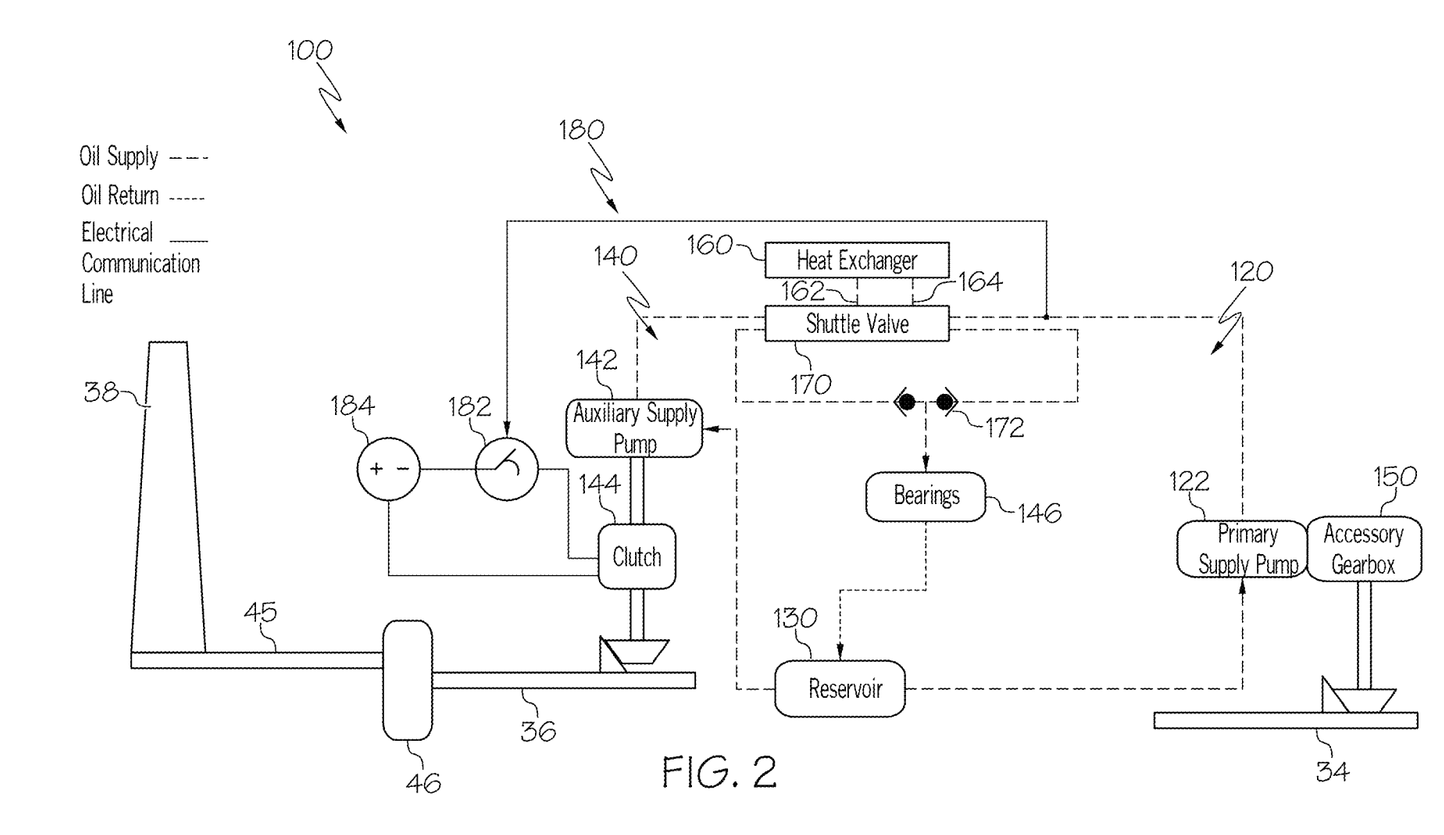
FIG. 2 schematically depicts a lubrication system of a gearbox assembly for a turbine engine, according to one or more embodiments shown and described herein.

Referring now to FIG. 2, a lubrication system 100 for the turbine engine 10 is depicted. In these embodiments, the lubrication system 100 may include a primary lubricant supply circuit 120 and an auxiliary lubricant supply circuit 140, which may operate in tandem to provide continuous lubrication to various components (e.g., bearings 146, gears, etc.) of the gearbox assembly 46 during various operational conditions of the turbine engine 10, as will be described in additional detail herein. Although the bearings 146 are schematically depicted as being separate from the gearbox assembly 46, it should be appreciated that the bearings 146 are a part of the gearbox assembly 46. However, the bearings 146 are depicted as being separate from the gearbox assembly 46 merely for purposes of more clearly illustrating the flow paths of lubricant between the reservoir 130, the primary supply pump 122, the auxiliary supply pump 142, and the shuttle valve 170.

In these embodiments, the primary lubricant supply circuit 120 may include a primary supply pump 122, which may be coupled to an accessory gearbox 150. As depicted in FIG. 2, the accessory gearbox 150 may be mechanically coupled to the HP shaft 34, such that rotation of the HP shaft 34 (as described herein with reference to FIG. 1) drives the accessory gearbox 150, and in turn, the primary supply pump 122.

Referring still to FIG. 2, the primary supply pump 122 may be fluidly coupled to a reservoir 130, such as a lubricant reservoir, which may be configured to store lubricant (e.g., oil, etc.). When activated, the primary supply pump 122 may draw lubricant from the reservoir 130 and circulate the lubricant to the bearings 146 and other similar components of the turbine engine 10, as will be described in additional detail herein with reference to FIG. 3A.

As further depicted in FIG. 2, the auxiliary lubricant supply circuit 140 may similarly include an auxiliary supply pump 142, which may be mechanically coupled to the LP shaft 36, and in turn, the fan 38 via a clutch 144. In these embodiments, the clutch 144 may be configured to engage and/or disengage the auxiliary supply pump 142 with the LP shaft 36 based on the operational state of the turbine engine 10. As referred to herein, the term "engage" refers to the clutch 144 being operable connected or coupled to the auxiliary supply pump 142 by any suitable device either integrally formed with the clutch 144 and/or the auxiliary supply pump 142 or some intermediate component. Similarly, the term "disengage" refers to a state in which the clutch 144 is not operable connected or coupled to the auxiliary supply pump 142. In these embodiments, the auxiliary supply pump 142 may be similarly fluidly coupled to the reservoir 130, such that, when the auxiliary supply pump 142 is activated (e.g., when the clutch 144 engages the auxiliary supply pump 142 and the LP shaft 36), rotation of the LP shaft 36 may power the auxiliary supply pump 142 to draw lubricant from the reservoir 130 and circulate the lubricant to the bearings 146 and other similar components of the turbine engine 10.

Furthermore, in some embodiments, the auxiliary supply pump 142 may be mechanically coupled to the fan shaft 45. For example, in the embodiments described herein, the turbine engine 10 may experience a failure scenario in which the fan shaft 45 continues to rotate while the LP shaft 36 is stagnant (e.g., due to broken shaft, broken coupling between the shaft and gearbox 46, etc.) Although not shown, it may be possible to ensure continued operation of the auxiliary lubricant supply circuit 140 during LP shaft 36 failure scenarios by directly coupling the auxiliary supply pump 142 to the fan shaft 45 independent of the LP shaft 36.

In the embodiments described herein, it should be further appreciated that the auxiliary supply pump 142 may be a bi-directional auxiliary supply pump capable of pumping lubricant in a first direction and/or a second direction opposite the first direction. By configuring the auxiliary supply pump 142 as a bi-directional pump, it may be possible to accommodate reverse rotation of the fan 38 when the turbine engine 10 is off, as will be described in additional detail herein.

Referring still to FIG. 2, the lubrication system 100 may further include a plurality of thermal management components configured to control a temperature and/or a flow of lubricant through the primary lubricant supply circuit 120 and/or the auxiliary lubricant supply circuit 140. For example, the lubrication system 100 may include a heat exchanger 160, such as an air/lubricant (e.g., oil) cooler, configured to cool the lubricant by transferring heat from the lubricant to another medium (e.g., air, etc.) passing through and/or over the heat exchanger 160. In these embodiments, the heat exchanger 160 may include a heat exchanger inlet that receives the lubricant and a heat exchanger outlet that dispenses cooled lubricant back into the lubrication system 100. As lubrication flows through the heat exchanger 160 (e.g., between the heat exchanger inlet and the heat exchanger outlet), heat from the lubricant may be conducted through the heat exchanger 160 and transferred to air flowing over the heat exchanger 160 to cool the lubricant. In these embodiments, the airflow used to cool the lubricant may be generated by the forward motion of the turbine engine 10 during operation.

In the embodiments described herein, the lubrication system 100 may further include a shuttle valve 170, which may be configured to direct a flow of lubricant from the primary lubricant supply circuit 120 and/or the auxiliary lubricant supply circuit 140 either through the heat exchanger 160 for temperature regulation or around (e.g., bypassing) the heat exchanger 160 based on an operational mode of the turbine engine 10. Accordingly, in these embodiments, it should be appreciated that the primary supply pump 122 and the auxiliary supply pump 142 may each be fluidly coupled to the shuttle valve 170, such that the primary supply pump 122 and the auxiliary supply pump 142 may draw lubricant from the reservoir 130 and direct the lubricant to the shuttle valve 170, and in turn, the heat exchanger 160. It should be appreciated that the shuttle valve 170 may alternatively be any other suitable valve. It should be appreciated that the shuttle valve 170 may be either passively or actively controlled. In embodiments in which the shuttle valve 170 is passively controlled, the shuttle valve 170 may be operated in response to a pressure within the lubrication system 100. For example, if the pressure within the lubrication system 100 exceeds a predetermined pressure, the shuttle valve 170 may be operated in a first state to permit the flow of lubricant through the heat exchanger 160. Alternatively, for example, if the pressure within the lubrication system 100 is below a predetermined pressure, the shuttle valve 170 may be operated in a second state to permit the flow of lubricant to bypass the heat exchanger 160. In other embodiments, the shuttle valve 170 may be operated manually be an operator, such as an engine controller. In other embodiments, the shuttle valve 170 may be controlled via a controller, e.g., an electronic control unit, configured to detect a pressure, temperature, or any other suitable parameter within the lubrications system 100 and appropriately operate the shuttle valve 170.

In addition to the shuttle valve 170, the lubrication system 100 may further include a plurality of check valves 172 disposed between the shuttle valve 170 and the bearings 146. In these embodiments, the plurality of check valves 172 may ensure that lubricant in the lubrication system 100 flows in a single direction (e.g., from the shuttle valve 170 to the bearings 146) in order to prevent reverse lubricant flow that may lead to contamination and/or damage of components within the turbine engine 10. For example, in these embodiments, when lubricant flows in a desired direction, the lubricant may generate a pressure that opens at least one of the plurality of check valve 172 to allow the lubricant to pass through the lubrication system 100. However, when lubricant attempts to flow in a reverse direction, the pressure differential of the lubricant changes, and the plurality of check valves 172 close to seal the valve and block the flow of lubricant. In the embodiments described herein, the plurality of check valves 172 may include ball check valves, swing check valves, lift check valves, diaphragm check valves, or any other suitable check valve. Furthermore, although the plurality of check valves 172 are depicted as being disposed between the shuttle valve 170 and the bearings 146, it should be appreciated that, in some embodiments, additional check valves 172 may be disposed within the lubrication system 100 (e.g., between the primary supply pump 122 and/or the auxiliary supply pump 142 and the heat exchanger 160, etc.).

Referring still to FIG. 2, the lubrication system 100 may further include a switching mechanism 180, which may be configured to determine an operational state of the turbine engine 10 to engage and/or disengage the auxiliary lubricant supply circuit 140. For example, the switching mechanism 180 may include a switch that is translatable between an open position, in which the clutch 144 is engaged with the auxiliary supply pump 142, and a closed position, in which the clutch 144 is disengaged from the auxiliary supply pump 142. In these embodiments, the switching mechanism 180 may be configured as a passive system (e.g., in which the presence of electrical power and/or lubricant pressure within the primary lubricant supply circuit 120 controls operation of the switch) and/or an active system.

As further depicted in FIG. 2, the switching mechanism 180 may include a sensor, such as a pressure sensor 182 (e.g., a lubricant pressure sensor), that monitors a pressure of lubricant flowing between the primary supply pump 122 and the shuttle valve 170. In these embodiments, the switching mechanism 180 may further include a power supply 184 that provides electrical power to the switching mechanism 180. Operation of the switching mechanism 180 and lubrication system 100 will be described in additional detail herein with reference to FIGS. 3A and 3B.

Figure 3A:
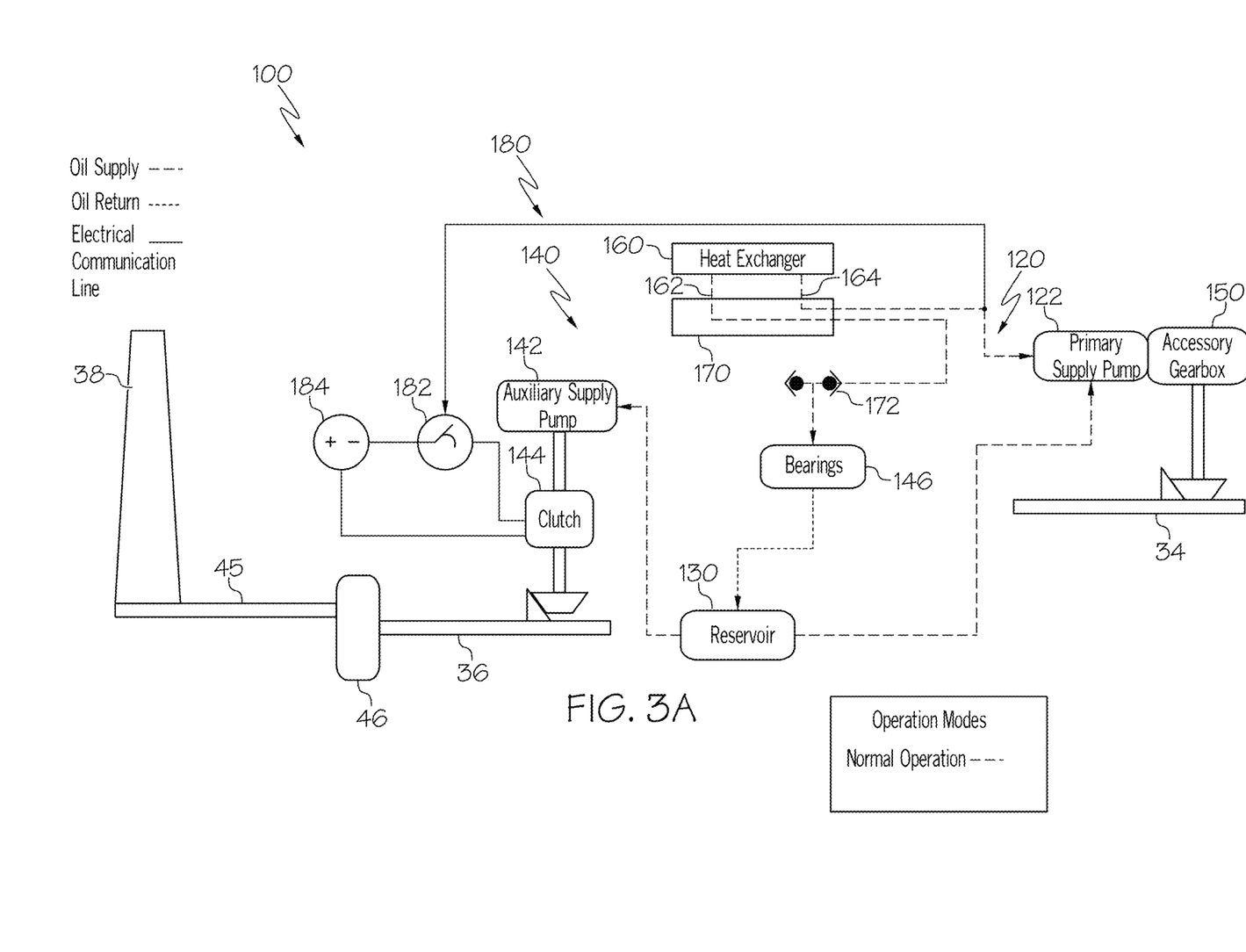
FIG. 3A schematically depicts a normal operational mode of the lubrication system of FIG. 2, according to one or more embodiments shown and described herein.
Figure 3B:
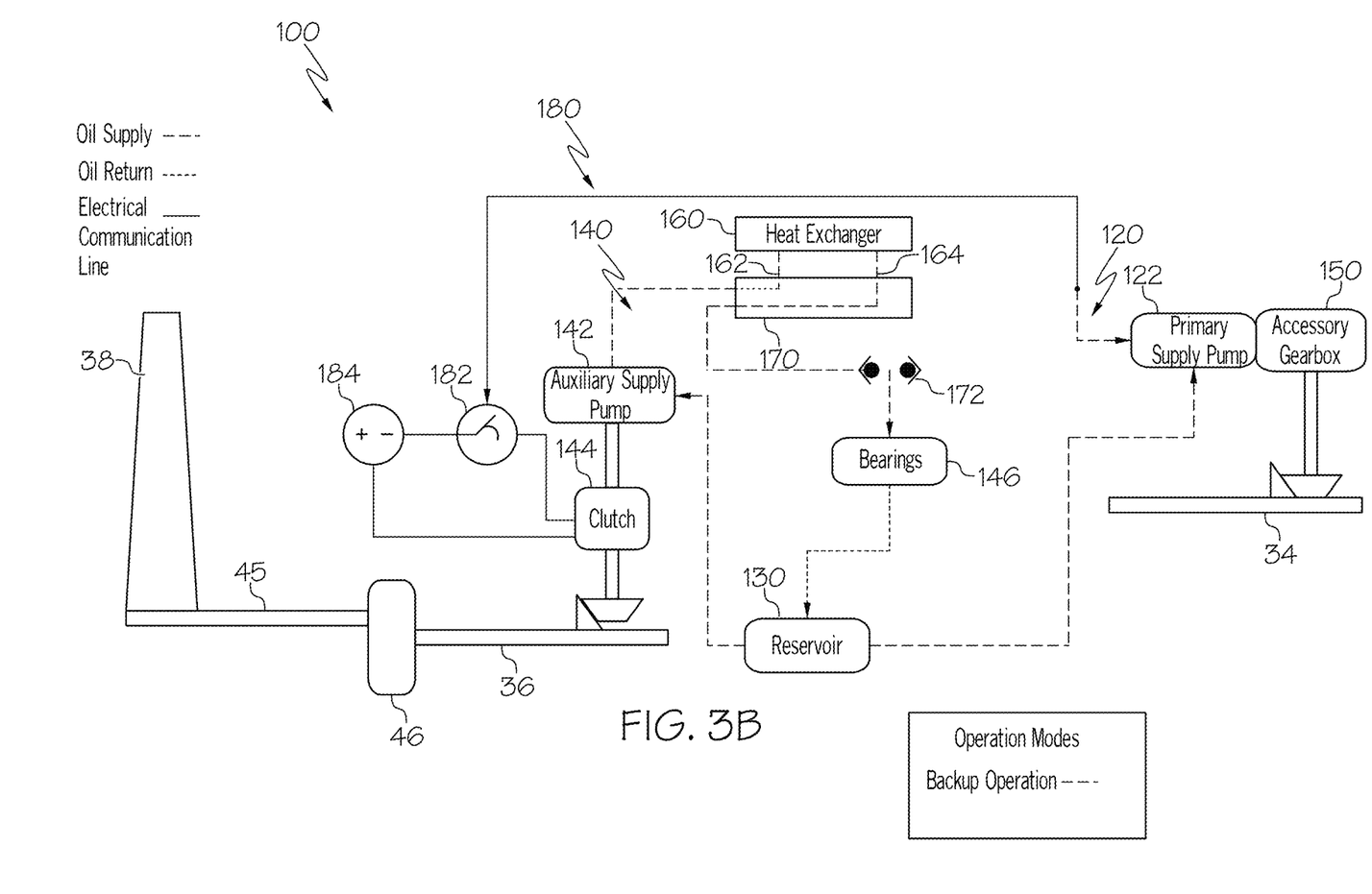
FIG. 3B schematically depicts a backup operational mode of the lubrication system of FIG. 2, according to one or more embodiments shown and described herein.

Referring now to FIGS. 3A and 3B, operation of the lubrication system 100 will be described with reference to various operational states of the turbine engine 10. For example, in the embodiments described herein, the turbine engine 10 may include a normal operation mode, in which the turbine engine 10 is powered on, and a backup operation mode, in which the turbine engine 10 is shut down and/or enters a windmill operation mode. As provided herein, the term "windmilling" may refer to a condition of the turbine engine 10 where the fan 38 of the turbine engine 10 continues to rotate due to motion of an aircraft and/or ambient wind even when the turbine engine 10 is powered off. In the embodiments described herein, windmill conditions may occur during in-flight shutdown ("IFSD") and/or when an aircraft is on the ground with the turbine engine 10 powered off.

As depicted in FIG. 3A, lubricant flow through the lubrication system 100 is depicted in the normal operation mode, as described herein. For example, in the normal operation mode, the turbine engine 10 is powered on, such that the HP shaft 34 drives the accessory gearbox 150 and the accessory gearbox 150 drives the primary supply pump 122 of the primary lubricant supply circuit 120. In these embodiments, with the primary supply pump 122 activated, the primary supply pump 122 may draw lubricant from the reservoir 130 and circulate the lubricant through the bearings 146 and/or heat exchanger 160, as has been described herein.

During normal operation (e.g., with the turbine engine 10 on and the primary lubricant supply circuit 120 activated), the pressure sensor 182 of the switching mechanism 180 may monitor pressure of the lubricant flowing through the primary lubricant supply circuit 120. In these embodiments, the pressure sensor 182 may ensure that the lubricant pressure remains at or above a predetermined lubricant threshold that is sufficient to circulate lubricant through the primary lubricant supply circuit 120, as has been described herein.

Referring still to FIG. 3A, during the normal operation mode of the turbine engine 10, the clutch 144 may maintain the auxiliary supply pump 142 of the auxiliary lubricant supply circuit 140 in a disengaged position (e.g., relative LP shaft 36) when the lubricant pressure within the primary lubricant supply circuit 120 remains at or above the predetermined lubricant threshold. In these embodiments, by disengaging the auxiliary supply pump 142 from the LP shaft 36, the auxiliary supply pump 142 may be inactive during normal operation modes of the turbine engine 10 (e.g., during operation of the primary lubricant supply circuit 120). It should be appreciated that, in the embodiments described herein, one of the primary lubricant supply circuit 120 or the auxiliary lubricant supply circuit 140 may be active at a time. For example, each of the auxiliary supply pump 142 and the primary supply pump 122 may be configured to maintain a particular lubricant pressure and lubricant flow rate within the lubrication system 100. In the event that each of the auxiliary supply pump 142 and the primary supply pump 122 are activated simultaneously, the auxiliary supply pump 142 and the primary supply pump 122 together may generate a lubricant pressure and/or a lubricant flow rate that exceeds a limit of the lubrication system 100, which may lead to reduced effectiveness of lubrication and cooling, and, in some instances, failure of the lubrication system 100.

Referring now to FIG. 3B, the lubrication system 100 may also operate in a backup operation mode in which the auxiliary lubricant supply circuit 140 is activated. For example, when the turbine engine 10 is in a windmill operational mode (e.g., when the turbine engine 10 is powered off and/or during an IFSD), rotation of the HP shaft 34 may be significantly limited and/or cease. In these embodiments, the components of the accessory gearbox 150 (e.g., bearings, gears, etc.) may impart a drag on the HP shaft 34, which utilize the rotational motion of the HP shaft 34 to operate. Furthermore, during windmill operation, airflow through the turbine engine 10 may be minimal, as the compressors of the turbine engine 10 may not be actively compressing air, such that no combustion is present to drive the turbine engine 10. In these embodiments, because the turbine engine 10 may not produce power, the HP shaft 34 may not receive the mechanical energy needed to rotate as the HP shaft 34 rotates under normal operating conditions.

In the embodiments described herein, because the primary supply pump 122 is driven by the HP shaft 34 (e.g., via accessory gearbox 150), the inactivity of the HP shaft 34 during backup (e.g., windmill) operations may prevent the primary supply pump 122 from circulating lubricant through the primary lubricant supply circuit 120. Accordingly, when the primary supply pump 122 ceases to circulate lubricant through the primary lubricant supply circuit 120, the lubricant pressure within the primary lubricant supply circuit 120 may drop below the predetermined lubricant threshold.

Referring still to FIG. 3B, when the pressure sensor 182 of the switching mechanism 180 determines that the lubricant pressure within the primary lubricant supply circuit 120 has dropped below the predetermined lubricant threshold, the switching mechanism 180 may activate the clutch 144, which may in turn engage the auxiliary supply pump 142 with the LP shaft 36 of the turbine engine 10. In these embodiments, although the turbine engine 10 may be off and/or in an IFSD mode, external forces (e.g., wind, other airflow) may continue to rotate the fan 38, and in turn, the fan shaft 45 during windmill operations.

In these embodiments, it should be further appreciated that the clutch 144 may be configured to engage the auxiliary supply pump 142 in a variety of circumstances, as will be described in additional detail herein. For example, in the embodiments described herein, the clutch 144 may be configured to engage the auxiliary supply pump 142 in the event electrical power to the power supply 184 is lost, and/or in instances in which the lubricant pressure within the primary lubricant supply circuit 120 drops below the predetermined lubricant threshold. Furthermore, in some embodiments, the clutch 144 may be passively configured such that the clutch 144 automatically engages the auxiliary supply pump 142 during a loss of power to the power supply 184 and/or when the lubricant pressure drops below the predetermined lubricant threshold, such that the clutch 144 is capable of operating without the use of the switching mechanism 180.

Referring still to FIG. 3B, the gearbox assembly 46 may further include a gear ratio that allows for the gearbox assembly 46 to rotate at a higher speed than the fan shaft 45.

Accordingly, the increased rotation speed of the gearbox assembly 46 may be capable of driving the LP shaft 36, which may engage and drive the auxiliary supply pump 142 when activated by the clutch 144, even when the turbine engine 10 is off and/or in an IFSD mode. With the auxiliary supply pump 142 activated, the auxiliary supply pump 142 may draw lubricant from the reservoir 130 and circulate lubricant through the auxiliary lubricant supply circuit 140 to ensure that lubricant is continuously supplied throughout the turbine engine 10 even with the primary lubricant supply circuit 120 being inactive.

Referring now to FIGS. 3A and 3B, in these embodiments, when the turbine engine 10 is powered on, the primary supply pump 122 may be reactivated, such that lubricant is circulated through the primary lubricant supply circuit 120. As lubricant begins to flow through the primary lubricant supply circuit 120, the pressure sensor 182 of the switching mechanism 180 may determine that the lubricant pressure within the primary lubricant supply circuit 120 meets and/or exceeds the predetermined lubricant threshold, at which time the pressure within the primary lubricant circuit 120 may act to close the switching mechanism 180, such that the clutch 144 disengages the auxiliary supply pump 142. With the clutch 144 disengaged, the auxiliary supply pump 142 may be disengaged from the LP shaft 36, such that lubricant ceases to flow through the auxiliary lubricant supply circuit 140.

Although FIGS. 3A and 3B depict the auxiliary lubricant supply circuit 140 and auxiliary supply pump 142 as being powered via the LP shaft 36, it should be appreciated that, in some embodiments, the lubrication system 100 may further include a separate power supply, such as an electrical power supply, for driving the auxiliary supply pump 142. Accordingly, in these embodiments, the auxiliary supply pump 142 may be operable regardless of a status of the fan 38 and/or LP shaft 36 (e.g., in instances when the fan 38 and/or LP shaft 36 are damaged, etc.). Furthermore, although activation of the primary lubricant supply circuit 120 and/or auxiliary lubricant supply circuit 140 is described as being automated via the switching mechanism 180, it should be understood that, in some embodiments, the auxiliary lubricant supply circuit 140 may be manually activated when the primary lubricant supply circuit 120 fails to maintain lubricant pressure.

Figure 4:
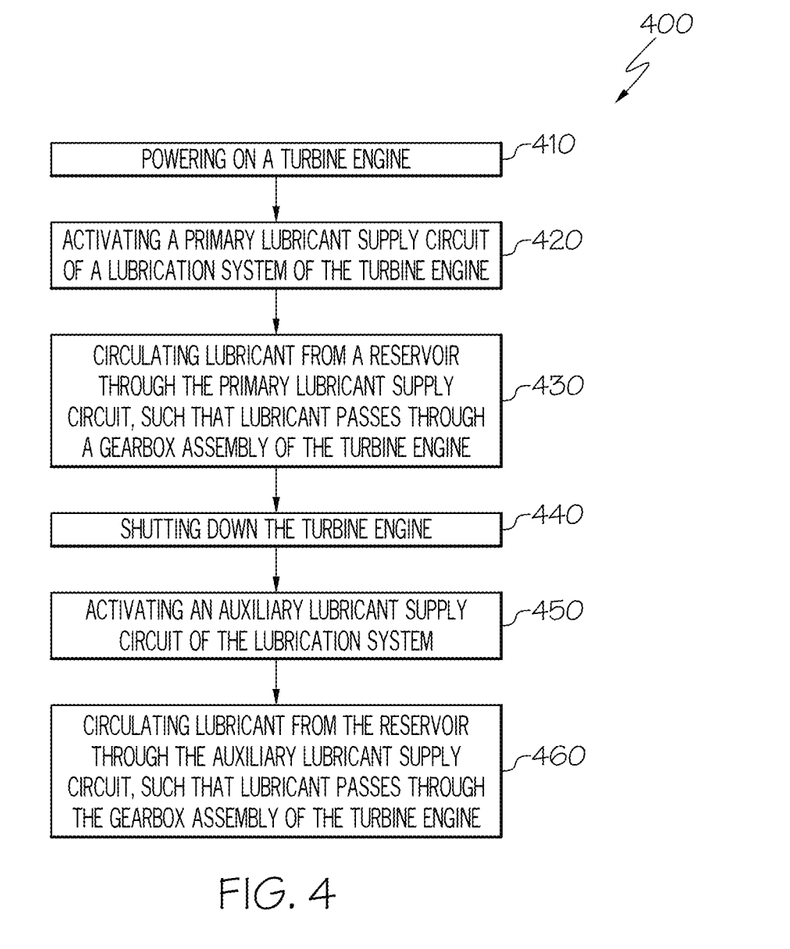
FIG. 4 schematically depicts a flow diagram of a method of supplying lubricant to a gearbox assembly using the lubrication system of FIG. 2, according to one or more embodiments shown and described herein.

Turning now to FIG. 4, with reference to FIGS. 1-3, a flow diagram of a method 400 of supplying lubricant to a gearbox assembly 46 of a turbine engine 10 is depicted. In these embodiments, the method 400 may initially involve powering on the turbine engine 10 such that the turbine engine 10 enters a normal operation mode, as depicted at block 410. With the turbine engine 10 in the normal operation mode, the method 400 may further involve activating a primary lubricant supply circuit 120 of a lubrication system 100 of the turbine engine 10, as depicted at block 420.

Once the primary lubricant supply circuit 120 is activated, the method 400 may proceed to block 430, which may involve circulating, via a primary supply pump 122, a lubricant from a reservoir 130 positioned within the turbine engine 10 through the primary lubricant supply circuit 120, such that the lubricant passes through various components of the gearbox assembly 36 such as, for example, the bearings 146, and returns to the reservoir 130. In these embodiments, the method step of block 430 may further involve circulating the lubricant through a heat exchanger 160 to adjust a temperature of the lubricant prior to passing the lubricant through the gearbox assembly 46 and/or returning the lubricant to the reservoir 130.

Referring still to FIG. 4, in these embodiments, the method 400 may further involve shutting down the turbine engine 10, such that the turbine engine 10 enters a backup, or windmilling, operation mode, as shown at block 440. With the turbine engine 10 powered off, the primary lubricant supply circuit 120 may be deactivated, such that the primary supply pump 122 ceases to circulate lubricant through the primary lubricant supply circuit 120, and in turn, the gearbox assembly 46 of the turbine engine 10.

With the turbine engine 10 shut down and the primary lubricant supply circuit 120 deactivated, the method 400 may advance to block 450, which may involve activating an auxiliary lubricant supply circuit 140. After the auxiliary lubricant supply circuit 140 is activated, the method 400 may proceed to block 460, which may involve circulating, via an auxiliary supply pump 142, a lubricant from the reservoir 130 through the auxiliary lubricant supply circuit 140, such that the lubricant passes through various components of the gearbox assembly 36 such as, for example, the bearings 146, and returns to the reservoir 130. In these embodiments, the method step of circulating lubricant via the auxiliary supply pump 142 may further involve engaging the auxiliary supply pump 142 with a shaft of the turbine engine 10 using a clutch 144, such that the rotation of a fan 38 of the turbine engine 10 during backup (e.g., windmill) operation mode may be used to power the auxiliary supply pump 142.

It should be appreciated that, in the embodiments described herein, lubricant may be circulated through the turbine engine 10 via the primary lubricant supply circuit 120 and/or the auxiliary lubricant supply circuit 140 based on the operating mode of the turbine engine 10. For example, the primary lubricant supply circuit 120 may be used to provide lubricant to the gearbox assembly 46 during normal operation (e.g., when the turbine engine 10 is powered on) while the auxiliary lubricant supply circuit 140 may be used to provide lubricant to the gearbox assembly 46 during backup operations (e.g., during windmill conditions). Furthermore, the step of activating and/or deactivating the primary lubricant supply circuit 120 and the auxiliary lubricant supply circuit 140 may be performed any number of times during a flight of the turbine engine 10, as may be necessitated by changes to the operating mode of the turbine engine 10 during flight.

In some embodiments, the method 400 may further involve utilizing a switching mechanism 180 to automatically activate and/or deactivate the auxiliary lubricant supply circuit 140 based on a lubricant pressure within the primary lubricant supply circuit 120. For example, in these embodiments, the switching mechanism 180 may include a pressure sensor 182 configured to monitor a lubricant pressure within the primary lubricant supply circuit 120. When the lubricant pressure drops below a predetermined lubricant threshold, the switching mechanism 180 may automatically activate the auxiliary lubricant supply circuit 140 to provide lubricant to the turbine engine 10. Similarly, when the pressure sensor 182 determines that the lubricant pressure meets and/or exceeds the predetermined lubricant threshold in the primary lubricant supply circuit 120, the switching mechanism 180 may automatically deactivate the auxiliary lubricant supply circuit 140, such that the auxiliary lubricant supply circuit 140 ceases to provide lubricant to the turbine engine 10.

In view of the foregoing, it is to be appreciated that defined herein are turbine engines, lubricant systems, and methods of lubricating gearbox assemblies in turbine engines. The lubrication system for a turbine engine includes a reservoir that stores a lubricant, a primary lubricant supply circuit including a primary supply pump fluidly coupled to the reservoir, and an auxiliary lubricant supply circuit including an auxiliary supply pump fluidly coupled to the reservoir. A clutch is mechanically coupled to the auxiliary supply pump, and, when activated, the clutch engages the auxiliary supply pump and a shaft of the turbine engine. The lubrication system further includes a switching mechanism including a pressure sensor that monitors a lubricant pressure within the primary lubricant supply circuit. When the lubricant pressure within the primary lubricant supply circuit falls below a predetermined lubricant threshold, the clutch is engaged with the auxiliary supply pump and the shaft of the turbine engine. By monitoring the lubricant pressure of the lubricant within the primary lubricant supply circuit, it may be possible to utilize the auxiliary lubricant supply circuit to maintain consistent lubrication of the turbine engine when the primary lubricant supply circuit is inactive, thereby ensuring the operational readiness and longevity of the turbine engine while mitigating the risk of wear and potential engine failure.

Further aspects of the embodiments described herein are provided by the subject matter of the following clauses:

A lubrication system for a turbine engine including: a reservoir configured to store a lubricant; a primary lubricant supply circuit, the primary lubricant supply circuit including a primary supply pump fluidly coupled to the reservoir; an auxiliary lubricant supply circuit, the auxiliary lubricant supply circuit including an auxiliary supply pump fluidly coupled to the reservoir; a clutch mechanically coupled to the auxiliary supply pump, the clutch configured to engage the auxiliary supply pump and a shaft of the turbine engine when activated; and a sensor that monitors a lubricant pressure within the primary lubricant supply circuit; wherein, when the lubricant pressure within the primary lubricant supply circuit falls below a predetermined lubricant threshold, the clutch is activated to engage the auxiliary supply pump and the shaft of the turbine engine.

The lubrication system according to the preceding clause, further including a heat exchanger configured to adjust a temperature of the lubricant circulated through the turbine engine.

The lubrication system according to any preceding clause, further including a shuttle valve fluidly coupled to the heat exchanger, the primary supply pump, and the auxiliary supply pump.

The lubrication system according to any preceding clause, wherein, when the temperature of the lubricant exceeds a predetermined temperature threshold, the shuttle valve is operable to permit the lubricant to pass through the heat exchanger.

The lubrication system according to any preceding clause, wherein, when the temperature of the lubricant is below a predetermined temperature threshold, the shuttle valve is operable to bypass the lubricant around the heat exchanger.

The lubrication system of according to any preceding clause, wherein the auxiliary supply pump is a bi-directional pump.

The lubrication system according to any preceding clause, further including a plurality of check valves operable to allow unilateral flow of the lubricant through the primary lubricant supply circuit and the auxiliary lubricant supply circuit.

The lubrication system according to any preceding clause, wherein, when the turbine engine is powered on, the primary lubricant supply circuit is activated and the auxiliary lubricant supply circuit is deactivated.

The lubrication system according to any preceding clause, wherein, when the turbine engine is powered off, the primary lubricant supply circuit is deactivated and the auxiliary lubricant supply circuit is activated.

The lubrication system according to any preceding clause, wherein the primary supply pump is mechanically coupled to an accessory gearbox of the turbine engine, such that rotation of the accessory gearbox is configured to power the primary supply pump.

A turbine engine including: a fan section including a fan; a fan shaft coupled to the fan, the fan shaft configured to rotate the fan; a turbine section including a high pressure shaft and a low pressure shaft; a gearbox assembly mechanically coupled to the turbine section; and a lubrication system including: a reservoir configured to store a lubricant; a primary lubricant supply circuit, the primary lubricant supply circuit including a primary supply pump fluidly to the reservoir and mechanically coupled to the high pressure shaft of the turbine section; an auxiliary lubricant supply circuit, the auxiliary lubricant supply circuit including an auxiliary supply pump fluidly coupled to the reservoir and mechanically coupled to the low pressure shaft of the turbine section via a clutch; and a sensor that monitors a lubricant pressure within the primary lubricant supply circuit; wherein, when the lubricant pressure within the primary lubricant supply circuit falls below a predetermined lubricant threshold, the clutch is activated to engage the auxiliary supply pump and the low pressure shaft of the turbine engine.

The turbine engine according to any preceding clause, wherein the lubrication system further includes a heat exchanger configured to adjust a temperature of the lubricant circulated through the turbine engine.

The turbine engine according to any preceding clause, further including a shuttle valve fluidly coupled to the heat exchanger, the primary supply pump, and the auxiliary supply pump.

The turbine engine according to any preceding clause, wherein the auxiliary supply pump is a bi-directional pump.

The turbine engine according to any preceding clause, further including a plurality of check valves positioned to allow unilateral flow of the lubricant through the primary lubricant supply circuit and the auxiliary lubricant supply circuit.

The turbine engine according to any preceding clause, wherein, when the turbine engine is powered on, the primary lubricant supply circuit is activated such that the primary supply pump is powered by the high pressure shaft, and the auxiliary lubricant supply circuit is disengaged from the low pressure shaft via the clutch.

The turbine engine according to any preceding clause, wherein, when the turbine engine is powered off, the primary lubricant supply circuit is deactivated and the auxiliary lubricant supply circuit is activated, such that the clutch engages the auxiliary supply pump and the low pressure shaft and the auxiliary supply pump is powered by the low pressure shaft.

A method of supplying lubricant to a gearbox assembly of a turbine engine including: powering on the turbine engine, such that the turbine engine enters a normal operation mode; activating a primary lubricant supply circuit of a lubrication system of the turbine engine; circulating, via a primary supply pump of the primary lubricant supply circuit, a lubricant from a reservoir positioned within the turbine engine through the primary lubricant supply circuit, such that the lubricant passes through the gearbox assembly and returns to the reservoir; shutting down the turbine engine, such that the turbine engine enters a windmilling operation mode and the primary lubricant supply circuit is deactivated; activating an auxiliary lubricant supply circuit of the lubrication system of the turbine engine; and circulating, via an auxiliary supply pump of the auxiliary lubricant supply circuit, the lubricant from the reservoir through the auxiliary lubricant supply circuit, such that the lubricant passes through the gearbox and returns to the reservoir.

The method according to any preceding clause, wherein the method step of circulating the lubricant through the primary lubricant supply circuit or circulating the lubricant through the auxiliary lubricant supply circuit further comprises circulating the lubricant through a heat exchanger to adjust a temperature of the lubricant prior to circulating the lubricant through the gearbox assembly.

The method according to any preceding clause, further including monitoring, via a pressure sensor, a lubricant pressure of the lubricant circulating through the primary lubricant supply circuit and activating the auxiliary lubricant supply circuit when the lubricant pressure falls below a predetermined lubricant threshold.

The method according to any preceding clause, further including operating a shuttle valve to permit the lubricant to pass through the heat exchanger when the temperature of the lubricant exceeds a predetermined temperature threshold.

The method according to any preceding clause, further including operating the shuttle valve to bypass the lubricant to around the heat exchanger when the temperature of the lubricant is below the predetermined temperature threshold.

The method according to any preceding clause, further including operating a plurality of check valves to allow unilateral flow of the lubricant through the primary lubricant supply circuit and the auxiliary lubricant supply circuit.

The method according to any preceding clause, further including activating the primary lubricant supply circuit and deactivating the auxiliary lubricant supply circuit when the turbine engine is powered on.

It will be apparent to those skilled in the art that various modifications and variations can be made to the embodiments described herein without departing from the scope of the claimed subject matter. Thus, it is intended that the specification cover the modifications and variations of the various embodiments described herein provided such modification and variations come within the scope of the appended claims and their equivalents.

What is claimed is:

1. A lubrication system for a turbine engine comprising:
   a reservoir configured to store a lubricant;
   a primary lubricant supply circuit, the primary lubricant supply circuit including a primary supply pump fluidly coupled to the reservoir;
   an auxiliary lubricant supply circuit, the auxiliary lubricant supply circuit including an auxiliary supply pump fluidly coupled to the reservoir;
   a clutch mechanically coupled to the auxiliary supply pump, the clutch configured to engage the auxiliary supply pump and a shaft of the turbine engine when activated and to disengage the auxiliary supply pump and the shaft when deactivated; and
   a sensor that monitors a lubricant pressure within the primary lubricant supply circuit;
   wherein, when the lubricant pressure within the primary lubricant supply circuit falls below a predetermined lubricant threshold, the clutch is activated to engage the auxiliary supply pump and the shaft of the turbine engine.

2. The lubrication system of claim 1, further comprising a heat exchanger configured to adjust a temperature of the lubricant circulated through the turbine engine.

3. The lubrication system of claim 2, further comprising a shuttle valve fluidly coupled to the heat exchanger, the primary supply pump, and the auxiliary supply pump.

4. The lubrication system of claim 3, wherein, when the temperature of the lubricant exceeds a predetermined temperature threshold, the shuttle valve is operable to permit the lubricant to pass through the heat exchanger.

5. The lubrication system of claim 4, wherein, when the temperature of the lubricant is below the predetermined temperature threshold, the shuttle valve is operable to bypass the lubricant around the heat exchanger.

6. The lubrication system of claim 1, wherein the auxiliary supply pump is a bi-directional pump.

7. The lubrication system of claim 1, further including a plurality of check valves operable to allow unilateral flow of the lubricant through the primary lubricant supply circuit and the auxiliary lubricant supply circuit.

8. The lubrication system of claim 1, wherein, when the turbine engine is powered on, the primary lubricant supply circuit is activated and the auxiliary lubricant supply circuit is deactivated.

9. The lubrication system of claim 1, wherein, when the turbine engine is powered off, the primary lubricant supply circuit is deactivated and the auxiliary lubricant supply circuit is activated.

10. The lubrication system of claim 1, wherein the primary supply pump is mechanically coupled to an accessory gearbox of the turbine engine, such that rotation of the accessory gearbox is configured to power the primary supply pump.

11. A turbine engine comprising:
a fan section including a fan;
a fan shaft coupled to the fan, the fan shaft configured to rotate the fan;
a turbine section including a high pressure shaft and a low pressure shaft;
a gearbox assembly mechanically coupled to the turbine section; and
a lubrication system comprising:
a reservoir configured to store a lubricant;
a primary lubricant supply circuit, the primary lubricant supply circuit including a primary supply pump fluidly coupled to the reservoir and mechanically coupled to the high pressure shaft of the turbine section;
an auxiliary lubricant supply circuit, the auxiliary lubricant supply circuit including an auxiliary supply pump fluidly coupled to the reservoir and mechanically coupled to the low pressure shaft of the turbine section via a clutch; and
a sensor that monitors a lubricant pressure within the primary lubricant supply circuit;
wherein, when the lubricant pressure within the primary lubricant supply circuit falls below a predetermined lubricant threshold, the clutch is activated to engage the auxiliary supply pump and the low pressure shaft of the turbine engine and is deactivated to disengage the auxiliary supply pump and the low pressure shaft.

12. The turbine engine of claim 11, wherein the lubrication system further includes a heat exchanger configured to adjust a temperature of the lubricant circulated through the turbine engine.

13. The turbine engine of claim 12, further comprising a shuttle valve fluidly coupled to the heat exchanger, the primary supply pump, and the auxiliary supply pump.

14. The turbine engine of claim 11, wherein the auxiliary supply pump is a bi-directional pump.

15. The turbine engine of claim 11, further comprising a plurality of check valves positioned to allow unilateral flow of the lubricant through the primary lubricant supply circuit and the auxiliary lubricant supply circuit.

16. The turbine engine of claim 11, wherein, when the turbine engine is powered on, the primary lubricant supply circuit is activated such that the primary supply pump is powered by the high pressure shaft, and the auxiliary lubricant supply circuit is disengaged from the low pressure shaft via the clutch.

17. The turbine engine of claim 11, wherein, when the turbine engine is powered off, the primary lubricant supply circuit is deactivated and the auxiliary lubricant supply circuit is activated, such that the clutch engages the auxiliary supply pump and the low pressure shaft and the auxiliary supply pump is powered by the low pressure shaft.

18. A method of supplying lubricant to a gearbox assembly of a turbine engine comprising:
powering on the turbine engine, such that the turbine engine enters a normal operation mode;
activating a primary lubricant supply circuit of a lubrication system of the turbine engine;
circulating, via a primary supply pump of the primary lubricant supply circuit, a lubricant from a reservoir positioned within the turbine engine through the primary lubricant supply circuit, such that the lubricant passes through the gearbox assembly and returns to the reservoir;
shutting down the turbine engine, such that the turbine engine enters a windmilling operation mode and the primary lubricant supply circuit is deactivated;
activating an auxiliary lubricant supply circuit of the lubrication system of the turbine engine, wherein activating the auxiliary lubricant supply circuit includes engaging an auxiliary supply pump and a shaft of the turbine engine with a clutch;
circulating, via the auxiliary supply pump of the auxiliary lubricant supply circuit, the lubricant from the reservoir through the auxiliary lubricant supply circuit, such that the lubricant passes through the gearbox assembly and returns to the reservoir; and
deactivating the auxiliary lubricant supply circuit when the turbine engine is powered on, wherein deactivating the auxiliary lubricant supply circuit includes disengaging the auxiliary supply pump and the shaft with the clutch.

19. The method of claim 18, wherein the method step of circulating the lubricant through the primary lubricant supply circuit or circulating the lubricant through the auxiliary lubricant supply circuit further comprises circulating the lubricant through a heat exchanger to adjust a temperature of the lubricant prior to circulating the lubricant through the gearbox assembly.

20. The method of claim 18, further comprising:
monitoring, via a sensor, a lubricant pressure of the lubricant circulating through the primary lubricant supply circuit; and
activating the auxiliary lubricant supply circuit when the lubricant pressure falls below a predetermined lubricant threshold.

* * * * *